(12) United States Patent
Gerdes

(10) Patent No.: US 8,991,629 B2
(45) Date of Patent: Mar. 31, 2015

(54) CAPLESS FILLER NECK

(75) Inventor: Ralf Gerdes, Köln (DE)

(73) Assignee: Gerdes GmbH, Kerpen (DE)

( * ) Notice: Subject to any disclaimer, the term of this patent is extended or adjusted under 35 U.S.C. 154(b) by 3 days.

(21) Appl. No.: 13/758,384

(22) PCT Filed: Aug. 12, 2011

(86) PCT No.: PCT/EP2011/063955
§ 371 (c)(1),
(2), (4) Date: Apr. 18, 2013

(87) PCT Pub. No.: WO2012/020128
PCT Pub. Date: Feb. 16, 2012

(65) Prior Publication Data
US 2013/0228576 A1    Sep. 5, 2013

(30) Foreign Application Priority Data

Aug. 12, 2010    (DE) .......................... 10 2010 036 970

(51) Int. Cl.
*B60K 15/04* (2006.01)
(52) U.S. Cl.
CPC ......... *B60K 15/04* (2013.01); *B60K 2015/0461* (2013.01); *B60K 2015/0429* (2013.01)
USPC ....................................... 220/86.2; 220/86.1
(58) Field of Classification Search
CPC ................... B60K 15/04; B60K 15/05; B60K 2015/0461; B60K 2015/0458
USPC ............................................... 220/86.2, 86.1
See application file for complete search history.

(56) References Cited

U.S. PATENT DOCUMENTS

| 6,983,773 B1* | 1/2006 | Hagano et al. ................. 141/350 |
| 2007/0000574 A1 | 1/2007 | DeCapua |
| 2009/0189106 A1* | 7/2009 | Hagano et al. ................. 251/147 |
| 2011/0108563 A1* | 5/2011 | Gerdes .......................... 220/810 |
| 2013/0341326 A1* | 12/2013 | Sasaki ...................... 220/203.06 |

FOREIGN PATENT DOCUMENTS

| EP | 1329353 | 7/2003 |
| WO | 2008/013325 A1 | 1/2008 |
| WO | WO2009135954 | 11/2009 |

OTHER PUBLICATIONS

International Search Report for International Application No. PCT/EP2011/063955; 4 Pages.
Japanese Office Action on JP 2013-523637, dated Nov. 21, 2014, and translation thereof.

\* cited by examiner

*Primary Examiner* — Anthony Stashick
*Assistant Examiner* — James Way
(74) *Attorney, Agent, or Firm* — Panitch Schwarze Belisario & Nadel LLP

(57) ABSTRACT

The invention relates to a capless filler neck having an upper closure flap 2 and a lower closure flap 3, which are arranged in a pipe section 1. The two closure flaps 2, 3 must be able to seal independently of one another. In known capless filler necks, this has the effect that, when the filler pipe 4 of a fuel nozzle is still partially inserted, the lower closure flap 3 is already closed, whereas the user still has the impression that tank filling can be carried out. As a result, fuel collects between the two closure flaps 2, 3.
The invention prevents this in that the lower closure flap 3 is opened or held open by the upper closure flap 2 or by an actuating element even when the filler pipe 4 is no longer in contact with the lower closure flap 2.

13 Claims, 3 Drawing Sheets

CAPLESS FILLER NECK

TECHNICAL FIELD

The invention relates to a capless filler neck with delayed-closing closure flap for a neck of a container, in particular of a tank of a motor vehicle with a pipe section running along a neck axis and with a closure mechanism, which has an upper closure flap and a lower closure flap arranged therebeneath, wherein at least the lower closure flap is constructed as a sealing flap and the upper closure flap and the lower closure flap are able to be pushed open by the insertion of a filler pipe into the pipe section against a restoring force for opening the closure mechanism.

PRIOR ART

Capless filler necks with delayed-closing closure flap of this kind are known from WO 2009/135954 A (GERDES GMBH) 12.11.2009. These are filler necks which securely close with the two closure flaps the filler neck of a fuel tank even without a separate tank cap. The two closure flaps are pushed open here by the pipe end of a fuel nozzle or of a refill can, hereinafter designated generally by filler pipe, wherein security mechanisms are usually present, which prevent unintentional opening. The tank can only be filled when both closure flaps are opened.

The disadvantage of the known filler necks can consist in that already when the filler pipe is only partially inserted or after filling the tank when the filler pipe is already partially withdrawn, the user already or still attempts to fill fuel in. In particular in the case where the lower closure flap is configured as a sealing flap, fuel can then, however, be filled above the already closed lower closure flap in the pipe neck, which then can no longer flow off downwards into the tank. This leads to the fuel being able to arrive into the environment via the venting systems, which is not desirable for ecological reasons.

BRIEF DESCRIPTION OF THE INVENTION

It is therefore an object of the invention to provide a neck end which also on actuation of the fuel nozzle after partial withdrawal from the neck end ensures as long as possible that the over-filled fuel flows into the tank.

This problem is solved according to the invention in that the upper closure flap is constructed and mounted such that with a closed upper closure flap and along a first swivelling path it is not situated in direct or indirect contact with the lower closure flap, and along a second swivelling path, adjoining the first swivelling path, it rests with a force transmission section on a pressure region of the lower closure flap at a distance from its swivel axis on the movable part of the lower closure flap such that the latter also without the influence of the filler pipe is opened at least by a few angular degrees, whilst the upper closure flap is moved along the second swivelling path.

A neck end with the features of Claim 10 represents a further solution to this problem. In all cases, the lower closure flap is a swivelling flap which, with the exception of the delayed closing according to the present invention, is pushed open per se independently of the upper closure flap by the filler pipe of the fuel nozzle when it is inserted into the tank.

Through the embodiment of the neck end in accordance with the invention, the lower closure flap can now remain opened over a longer period of time. Whereas in the known embodiment the lower closure flap closes, and consequently seals, immediately after the lower edge of the fuel nozzle has left from the swivelling range of the lower closure flap, the lower closure flap now remains opened for longer. The entire opening angle is indeed not available, however the remaining opening angle is sufficient in order to reliably permit the quantity of fuel to run off downwards which was still filled with an almost withdrawn fuel nozzle. The reason for this is that in accordance with experience, the full pumping power of the fuel nozzle is only called upon when it is situated completely in the neck.

However, on withdrawing the fuel nozzle, the user tends either to briefly empty the delivery hose once again or to fill a further small remainder, in order to putatively fill the tank completely. This "topping up" procedure is, however, usually carried out carefully and hence with a low pumping power of the fuel dispenser, so that a small opening angle of the lower closure flap is sufficient, in order to still allow the topped-up fuel to flow off until the lower closure flap then closes in a sealing manner.

An essential feature of the invention is the fact that the upper closure flap or an auxiliary element between the upper closure flap and the lower closure flap as a result of the partially inserted filler pipe causes the lower closure flap, urged into closure position by the force of a spring, to remain still opened for a certain amount of time. This time is determined by the mechanical action of the lower region of the filler pipe of the fuel nozzle, as long as it is situated between the two closure flaps. According to the invention, therefore, the lower closure flap is pressed down mechanically via a lever which is actuated by the fuel nozzle.

Since in many cases it is required that the two closure flaps are independent of one another, it is not possible to couple the two closure flaps directly with one another, so that a pressure onto the upper closure flap also directly activates a pressure onto the lower closure flap.

The invention now solves this problem in that firstly a first swivelling range is available, over which the upper closure flap is able to be swivelled by the inserted filler pipe, or that the lower closure flap moves. Adjoining this first swivelling range there is finally now a second swivelling range, via which the further swivelling movement of the upper closure flap exerts a direct pressure or an indirect pressure onto the lower closure flap in the sense that the lower closure flap opens at least by a few angular degrees and thus becomes penetrable by fluid.

In the sense of the above-mentioned function, an indirect opening means that the upper closure flap exerts a pressure onto the lower closure flap via an additional actuating element. Direct opening is to be understood in the sense of the invention to mean that the upper closure flap is urged by a section directly against the lower closure flap and consequently applies the opening force, which is necessary for overcoming the restoring force, itself onto the lower closure flap.

Considered in the abstract, the upper closure flap therefore has a force transmission section or respectively presses a force transmission section of a separate actuating element downwards into the neck in the direction of the lower closure flap, wherein the force transmission section then rests onto a pressure region of the lower closure flap, displacing the latter.

So that the opening force, or respectively, regarded from the point of view of the swivel axis, the opening moment, can be applied, the pressure region must be arranged at a distance from the swivel axis in the direction of the neck axis, so that an opening moment can be applied by the pressure of the force transmission section. It is immaterial here whether the closure flaps open in the same direction or reciprocally, therefore are articulated on different sides of the pipe section. Also, the closure flaps do not have to be constructed so as to be flat; on the contrary, they will usually have an inner flap space in which for example over- and under-pressure valves are arranged.

The closure flaps can be shaped so that the opening of the lower closure flap is retained over as large a swivelling range as possible. In a preferred embodiment, the upper closure flap is provided with a flap body which is constructed substantially cylindrically and has a flange projecting laterally in the lower region, on which flange, surrounding the flap body, the seal of the lower closure flap is arranged. This seal, on closing of the lower closure flap, is pressed against a corresponding edge of the neck.

The swivel axis is arranged somewhat above the flange. In this embodiment, the part of the flange lying opposite the swivel axis forms the force transmission region. This means that the underside of the flange, on opening of the upper closure flap, pushes around the swivel axis beyond the first swivelling path against the pressure region of the lower closure flap and with further swivelling movement in the opening direction presses the lower closure flap downwards and thus opens it at least slightly.

The upper closure flap can be constructed so as to be flat on its upper side. However, it is also possible that it has an elevation on its upper side, so that already before the cross-sectional plane of the pipe section in which the swivel axis is situated, a contact occurs between the filler pipe of the fuel nozzle under the upper closure flap. This has the effect that the upper closure flap is pressed down earlier and, vice versa, also closes later. This, in turn, means that the opening or respectively the closing of the lower closure flap as a result of the contact force occurring after following the first swivelling path occurs earlier or respectively later.

In a similar manner via the variation of its surface shape, the lower closure flap can make provision that it comes into contact earlier or later with the downwardly swivelled upper closure flap. The pressure region of the lower closure flap can be constructed accordingly for this. Only the fact when the movement lines of the two flaps meet is essential for the chronological sequence of the opening of the two closure flaps.

An alternative embodiment of the invention uses an additional component. This component can be constructed, for example, as a bent lever and be provided inside the pipe section between the upper closure flap and the lower closure flap as an actuating means for the premature opening of the lower closure flap. Such a bent lever can be constructed for example as a lever which is mounted articulatedly by one end on the pipe section.

The opposite, free end of the lever then projects in the direction of the neck axis and into the path of movement of the fuel nozzle, so that the inserted fuel nozzle presses the lever downwards. With a suitable arrangement and length of the lever, the latter then pushes with its free end onto the pressure surface of the lower closure flap and pushes the latter open, as already described above in connection with the upper closure flap. Here, also, the geometry of the lever and of the lower closure flap can optimize the opening times.

Alternatively to a lever, a hollow cylindrical element can also be provided displaceably between the two closure flaps, which, after a certain opening angle of the upper closure flap, is pressed downwards either by the fuel nozzle or by the upper closure flap and opens the lower closure flap slightly.

Further features and advantages of the invention will emerge from the subclaims and from the following description of a preferred example embodiment, with the aid of the drawings.

BRIEF DESCRIPTION OF THE FIGURES OF THE DRAWINGS

In the drawings there are shown
FIG. 1 a sectional view of a neck end according to an embodiment of the invention.

DESCRIPTION OF THE TYPES OF EMBODIMENT

Figure 1:
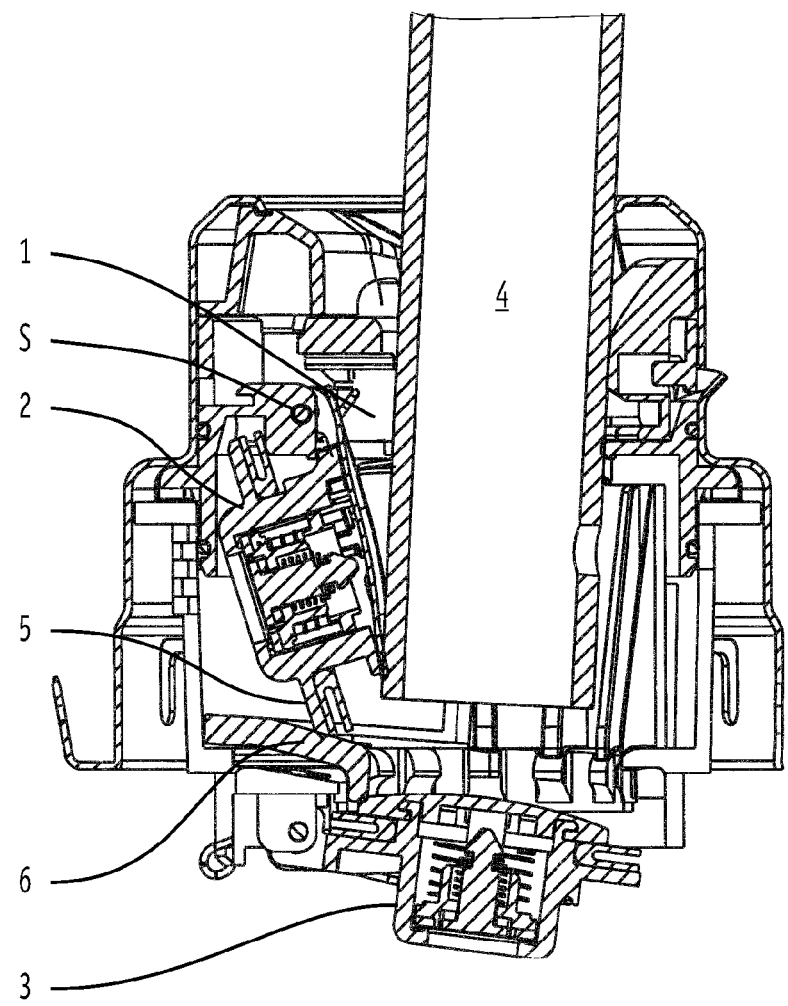

The neck end has in the upper region of its pipe section 1 an introduction funnel for the insertion of the filler pipe 4 of a fuel nozzle. The upper closure flap 2 is provided thereatneath. This upper closure flap 2 is swivellably mounted about a swivel axis S and can be pushed open by the introduced fuel nozzle. In the lower region, the upper closure flap 2 has a flange bearing a seal.

The flange of the closure flap 2 moves with its edge facing away from the swivel axis S along a circular path. This movement line initially runs in a circular shape from a lateral position starting from above downwards about the swivel axis S. After a first angle section of the movement line, a first swivelling path is passed through, whilst the upper closure flap 2 is not yet in contact with the lower closure flap 3. This ensures that both flaps 2, 3 operate independently of one another and both can respectively seal the neck.

The upper closure flap 2 only abuts against the upper side of the lower closure flap 3 after passing through the first swivelling path. As the further movement line of the edge—the right edge in the drawings—of the flange, i.e. the edge which lies opposite the swivel axis S, crosses the plane of the upper side of the lower closure flap 3, by a further opening of the upper closure flap 2 opening also takes place slightly into the lower closure flap 3, without the filler pipe 4 of the fuel nozzle having to come into contact with the lower closure flap 3.

In the same way, the lower closure flap 3 also only closes when the upper closure flap 2 has moved back into the region of the first swivelling path, which only occurs when the filler pipe 4 of the fuel nozzle is withdrawn comparatively far out from the pipe section 1. Compared with earlier embodiments, in which the lower closure flap 3 already closed when the contact between the filler pipe 4 of the fuel nozzle and the lower closure flap 3 was lost, the closing process now takes place again substantially later, so that fuel which is still flowing out from the fuel nozzle can run into the tank through the lower closure flap 3. This thus prevents a greater quantity of fuel from collecting between the two closure flaps 2, 3 or arriving into the environment via the venting of the tank system.

So that the upper closure flap 2 can push open the lower closure flap 3, the upper closure flap 2 has a force transmission region 5 in the described region of the flange, which on reaching the second swivelling path rests onto a pressure region 6 of the lower closure flap.

The pressure region can basically be formed from any part of the lower closure flap 3 which can come in contact with the force transmission section 5.

A particularly preferred embodiment, however, is the one which is represented in FIG. 1: Here, the swivel region of the upper closure flap, with the exception of the force transmission section 5, lies outside the lower closure flap 3. The force transmission section 5 also does not press here onto the lower closure flap 3 itself, but rather onto the pressure region 6, arranged outside the sealing region, which pressure region is constructed here as an extension of the lower closure flap 2 directed radially outwards beyond the swivel axis S in the opposite direction to the lower closure flap 3. This makes it possible that the lower closure flap can be arranged deeper in the pipe neck, because the distances of the swivelling movements or respectively radii are balanced by the force transmission section 5 and the pressure region 6.

This is also important, inter alia, because the lower closure flap 3 must indeed lie in the range of the filler pipe, but is to be arranged as deep as possible within this range, so that it is protected as well as possible as a sealing flap from the effects of accidents, which affect the vehicle body. By the force transmission section, which extends the upper closure flap radially on the side facing away from the swivel axis, and by the optional pressure region, which additionally or alternatively moves upwards the pressure area for slight pushing open, the lower closure flap 3 can now be optimally placed and nevertheless constructed as a flap which is to be opened independently of the swivelling movement of the upper closure flap 2. This means that even if the upper closure flap is damaged or is absent entirely, on the one hand the pipe neck remains sealed, but for example remains accessible for emptying.

Figure 2:
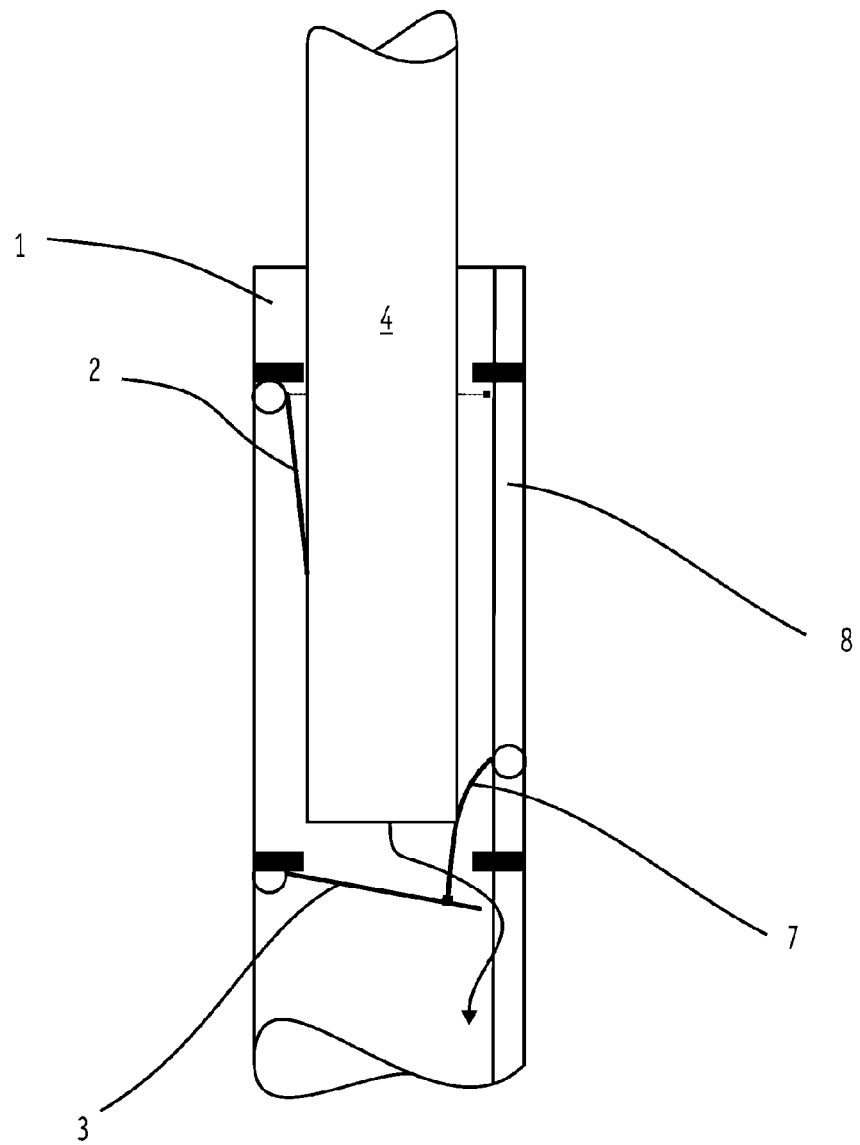
FIG. 2 diagrammatically an alternative embodiment of the invention.

A variant of the invention is represented in FIG. 2. Here, the lower closure flap 3 is not held open by the upper closure flap 2, but rather by an auxiliary component in the form of an opening lever 7. Adjacent to this opening lever 7 is a receiving groove 8, into which the lever can be displaced by the filler pipe 4, and in which also the swivel bearing is situated. However, depending on local space conditions, such a receiving groove 8 can also be dispensed with.

The opening lever 7 is curved here in order to be able to hold the lower closure flap 3 open. Instead of the illustrated curvature, it can also be constructed so as to be angled, in particular right-angled.

Figure 3:
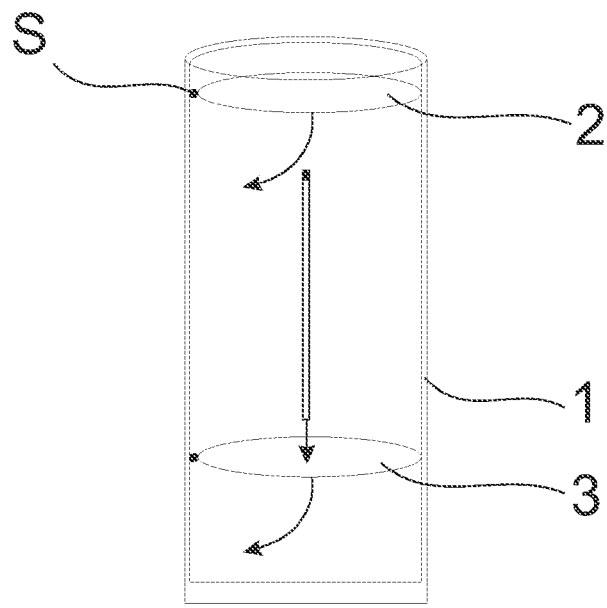
FIG. 3 a further embodiment of the invention.
Figure 4:
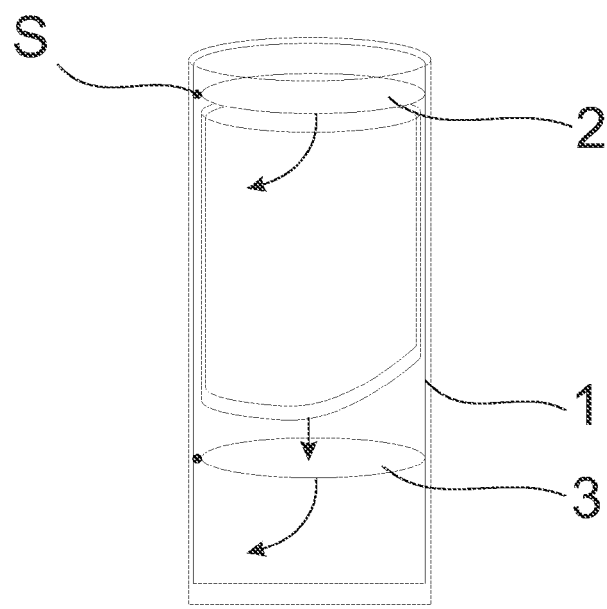
FIG. 4 yet a further embodiment of the invention.

FIGS. 3 and 4 show further variations mentioned above. In FIG. 3, an auxiliary element, such as a rod or pin, may be arranged between the upper closure flap 2 and the lower closure flap 3 so that the pressure is applied indirectly from upper closure flap 2 to lower closure flap 3. In FIG. 4, the auxiliary element is shown as a hollow cylindrical element or sleeve, which may, when upper closure flap 2 is opened, e.g., when a filler pipe 4 is inserted, be displaced in the direction of lower closure flap 3 and thereby open lower closure flap 3 slightly.

In all embodiments of the invention, the lower closure flap 3 remains opened for a particular length of time through the embodiment according to the invention, so that fuel which is still flowing out from the filler pipe 4 can flow through this opening into the tank, as is represented diagrammatically by the arrow in FIG. 2.

LIST OF REFERENCE NUMBERS 1 pipe section
2 upper closure flap
3 lower closure flap
4 filler pipe
5 force transmission section
6 pressure region
7 opening lever
8 receiving groove
S swivel axis

The invention claimed is:

1. A capless filler neck for a neck of a container, comprising:
   a pipe section running along a neck axis, and
   a closure mechanism, including an upper closure flap and a lower closure flap arranged therebeneath at a distance therefrom, each of the upper and lower closure flaps being constructed as a sealing flap, wherein the upper closure flap and the lower closure flap are swivellably mounted for opening, respectively, about an upper swivel axis and a lower swivel axis, and are swivellable against respective restoring forces for opening the closure mechanism by the introduction of a filler pipe into the pipe section,
   wherein the upper closure flap is constructed and mounted such that with a closed upper closure flap and along a first swivelling path, the upper closure flap is not in direct or indirect contact with the lower closure flap, and along a second swivelling path adjoining the first swivelling path, the upper closure flap rests with a force transmission section onto a pressure region of the lower closure flap at a distance from the upper swivel axis onto a movable part of the lower closure flap such that the lower closure flap is also opened at least by a few angular degrees, but not opened to an extent that the filler pipe would fit through, without the insertion of the filler pipe through the lower closure flap while the upper closure flap is moved along the second swivelling path.

2. The capless filler neck according to claim 1, wherein the upper closure flap has a width which is greater than the distance from the upper swivel axis of the upper closure flap to the pressure region of the lower closure flap, and wherein an edge region of the upper closure flap, lying opposite the upper swivel axis, forms the force transmission section, wherein during a swivelling movement of the upper closure flap, the edge region forming the force transmission section is moved along a partial circular path such that the pressure region is intersected by the partial circular path or lies above the partial circular path, so that the upper closure flap, starting from a position between the closed state and a maximum opening angle, is arranged to press onto the pressure region, to displace the pressure region downwards and partially open the lower closure flap.

3. The capless filler neck according to one of the two preceding claims, further comprising a pressure element arranged between the upper closure flap and the lower closure flap and mounted displaceably on the pipe section, wherein the upper closure flap, in the course of the swivelling movement, is arranged to cause the pressure element to press substantially downwards in the opening direction during the further swivelling movement, and wherein the lower closure flap is constructed and arranged such that the pressure element, if displaced downwards by the upper closure flap, is arranged to cause the lower closure flap to swivel open at least slightly.

4. The capless filler neck according to claim 1 or claim 2, wherein the upper closure flap has an elevation in the form of a convex surface or of an upwardly projecting pin-shaped displacement means in an impacting area of the inserted filler pipe with the upper closure cap, so that the upper closure flap is configured to remain opened over a greater displacement path of the filler pipe than would be the case without the elevation and at the same time to hold the lower closure flap slightly open.

5. The capless filler neck according to claim 1 or claim 2, wherein the upper closure flap has a flap body provided circumferentially with a laterally projecting flange, on an upper side of which a seal is arranged for the upper closure flap, wherein a region of the flange lying opposite the upper swivel axis forms with its underside the force transmission section.

6. The capless filler neck according to claim 5, further comprising a pressure section, which has on an upper side the pressure region, and which is configured to press with a force transmission element onto a movable part of the lower closure flap at a distance from the lower swivel axis.

7. The capless filler neck according to claim 6, wherein the pressure section is mounted swivellably in the pipe section.

8. The capless filler neck according to claim 1 or claim 2, wherein the upper swivel axis and the lower swivel axis are arranged on one side of the pipe section, wherein the upper and lower swivel axes run one over another and parallel to one another.

9. The capless filler neck according to claim 1 or claim 2, wherein the upper swivel axis and the lower swivel axis are arranged on opposite sides of the pipe section, wherein the upper and lower swivel axes run one over another and skew or parallel to one another.

10. A capless filler neck for a neck of a container, comprising:
    a pipe section running along a neck axis;
    a closure mechanism, including an upper closure flap and a lower closure flap arranged therebeneath, wherein at least the lower sealing flap is constructed as a sealing flap, and the upper closure flap and the lower closure flap are swivellable, against respective restoring forces, for opening the closure mechanism by the introduction of a filler pipe into the pipe section; and
    an opening lever arranged between the upper closure flap and the lower closure flap, on a side of the pipe section lying opposite a swivel axis of the upper closure flap, wherein the opening lever is arranged swivellably about an opening lever swivel axis and projects by a free end into a path of movement of the filler pipe and is arranged to be swiveled by the inserted filler pipe in a direction of the lower closure flap, wherein the free end is sufficiently long that at a distance from the swivel axis of the lower closure flap, the free end is arranged to impinge onto the lower closure flap and to push the lower closure flap open to an extent less than sufficient to permit insertion of the filler pipe through the lower closure flap without direct application of the filler pipe to the lower closure flap, and
    wherein the opening lever and the pipe section are constructed such that the opening lever, with a filler pipe inserted further through the lower closure flap, is arranged adjacent to the inserted pipe, and on withdrawing of the filler pipe, the opening lever initially moves into a path of movement of the lower closure flap and subsequently permits the lower closure flap to spring back in a delayed manner into a position of rest.

11. The capless filler neck according to claim 10, wherein the opening lever comprises a curved or right-angled bent lever, which is articulated by a downwardly directed free end on an inner side of the pipe section and extends by an opposite free end in the position of rest in the direction of the neck axis.

12. The capless filler neck according to claim 3, wherein the pressure element has the form of a force transmission pin or a force transmission sleeve.

13. The capless filler neck according to claim 1, wherein the lower closure flap is configured to be pushed open into a position that is sufficient to permit insertion of the filler pipe only by direct contact of the filler pipe with the lower closure flap.

* * * * *